Dec. 29, 1959          C. P. SIMAS          2,918,955

COMBINATION DRILLING AND SAWING DEVICE

Filed Nov. 7, 1957

INVENTOR.
Charles P. Simas
BY Harold E. Cole
Attorney ic Office 2,918,955
Patented Dec. 29, 1959

2,918,955

COMBINATION DRILLING AND SAWING DEVICE

Charles P. Simas, Taunton, Mass.

Application November 7, 1957, Serial No. 695,156

3 Claims. (Cl. 145—130)

This invention relates to a device that will drill and saw.

One object of my invention is to provide an improvement in a single device, which can be used, in a continuous, rotating operation, to drill a hole through a piece of material and then continuing with a sawing, circumferential action, that enlarges the hole.

Another object is to provide a plurality of teeth, extending in opposite directions from intermediate parts in the connecting web that is between two grooves of my device, which teeth will perform the sawing operation within a hole.

A further object is to provide two sets of teeth in a said connecting web, one set of which will cut during an inward movement of my device, while the other set will cut during an outward movement.

The foregoing and other objects which will appear as the nature of the invention is better understood, may be accomplished by a construction and arrangement such as is disclosed by the drawing. The nature of the invention is such as to render it susceptible to various changes and modifications, and, therefore, I am not to be limited to the construction disclosed by the drawing, nor to the particular arrangement described in the specification; but am entitled to all such changes therefrom as fall within the scope of my claims.

Figure 1:
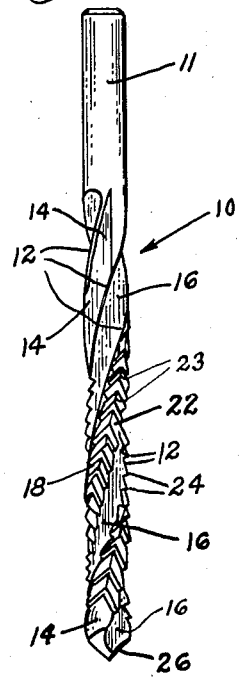
Fig. 1 is a front elevational view of my device.

As illustrated, my device has an elongate body 10 having, at its rear or inner ends, a shank 11 by which it is held in the usual drill chuck. Forwardly of said shank 11 are the usual drill cutting edges 12 at opposite side extremities of spiral web portions 14, the latter being spaced apart by corresponding spiral grooves 16.

Intermediate said usual cutting edges 12 of a said web portion 14, there are many pairs of teeth 18 and 22 formed in said web portion 14, each tooth of a pair, being separated from the other, by a longitudinally, extending ridge 23 intermediate opposite sides of said web portion 14. A set of said teeth 18 and 22 and bridge 23, extend from the interior of said body peripherally outward, repeating this formation so that each said set commences, at said body interior, immediately beyond the end of the previous set.

Each of said teeth 18 and 22 slant obliquely from a said ridge 23 in opposite lateral directions, laterally forward, terminating in sharp points 24, at said cutting edges 12.

These sets of two said teeth and a said ridge between them, are repeated until they reach the forward end portions 26 of said body 10, as shown, which serve as an ordinary drill portion.

After a hole is drilled in wood or other material by my device in the ordinary way, the latter is brought into contact with the material that forms the inner periphery of said hole. Said teeth 18 and 22 cut the material away by a saw-like action during the inward stroke; but not during the outward stroke. This cutting movement inwardly, and neutral movement outwardly, is repeated until the hole has been enlarged as desired.

My device is preferably rotated by a hand or electric drill as this peripheral, cutting action takes place around the hole, although it is effective if operated by hand, without rotation.

Figure 2:
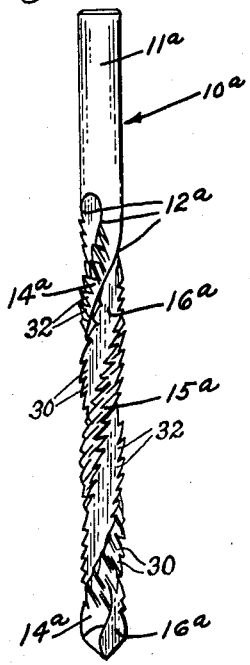
Fig. 2 is a front elevational view of a modified form of my device.
Figure 3:
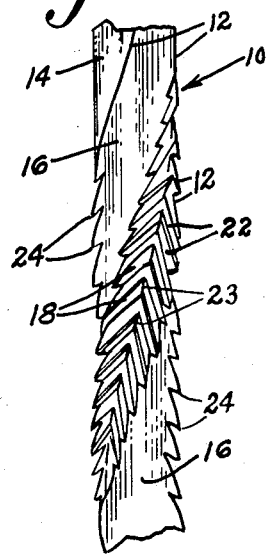
Fig. 3 is an enlarged, fragmentary view of my device, that is otherwise similar to Fig. 1.
Figure 4:
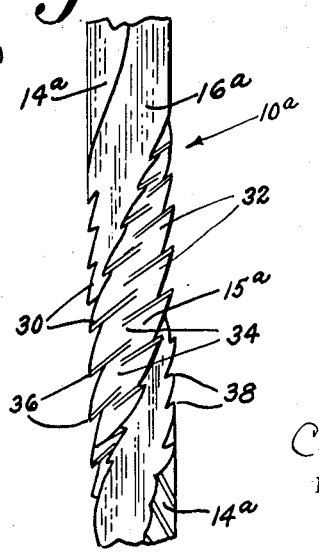
Fig. 4 is an enlarged, fragmentary view of said modified form of my device, that is otherwise similar to Fig. 2.
Figure 5:
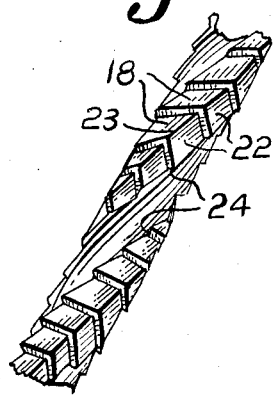
Fig. 5 is an enlarged perspective view of a segment of the web portion of my device.

It is desirable, for some operations, to effect the sawing action in both inward and outward movements, and to accomplish this I show a modified form of my device in Figs. 2 and 4. This modification has the usual elongate body 10a with said shank 11a, and the usual drill cutting edges 12a. There are two spiral web portions 14a and 15a spaced apart by spiral grooves 16a.

Formed in said web portions 14a and 15a are teeth 30 and 32, which commence at the interior of said body 10a and extend peripherally outward. They also extend laterally in opposite directions to the outside edges of said web portions, each tooth commencing at an intermediate part 34 of a said web portion. A said tooth 30 extends obliquely, laterally outward and forward, terminating in a sharp outside point 36. The other said tooth 32 formed in the same web portion, extends obliquely, (towards the shank 11a) terminating in a sharp outside point 38.

Said teeth 30 and 32 may overlap each other in a said web portion, as shown in said Fig. 4, as they need not start from the same intermediate point. However, from a said intermediate part 34 in a said web portion, the teeth 30, at one side, all extend laterally and forwardly, while the teeth 32 at the opposite side thereof, all extend laterally and rearwardly. Said teeth 30 and 32 so extend in reverse order in the two different web portions 14a and 15a. For instance, the teeth 32 that extend laterally rearward in said web portion 14a are directly across from, and nearest, the teeth 32 in the other said web portion 15a that extend in the same direction, being spaced only by a said groove 16a between them. Likewise the teeth 30 that extend laterally forward in a said web portion 14a are directly across from and nearest, the teeth 30 in the other said web portion 15a.

By this arrangement of teeth shown in said Figs. 2 and 4, a cutting or sawing action is effected, in both the inward and outward movement of my device, since said teeth 30 cut the material during the inward movement of my device, while said teeth 32 cut it during the outward movement.

What I claim is:

1. A combination drilling and sawing device, comprising a body embodying web portions, and having grooves between said web portions, a plurality of pairs of teeth, each said tooth of a said pair extending from the interior of said body peripherally outward from the same point in an intermediate part of said web portion and extending laterally and forwardly to, and terminating in a sharp point at, the lateral edges of said web portions.

2. A combination drilling and sawing device, comprising a body embodying web portions, and having grooves between said web portions, a plurality of pairs of teeth in said web portions, each said tooth of a said pair extending peripherally outward from the same point commencing at substantially the longitudinal center point of said web portion, the two teeth of a said pair extending laterally from said point in opposite oblique directions to the lateral edges of said web portions.

3. A combination drilling and sawing device, comprising a body embodying web portions, and having grooves between said web portions, a plurality of pairs of teeth in said web portions, each said tooth of a said pair extending peripherally outward from the same point commencing at substantially the longitudinal center point of said web portion, the two teeth of a said pair extending laterally from said point in opposite oblique directions, and forwardly, to the lateral edges of said web portions.

References Cited in the file of this patent

UNITED STATES PATENTS

| | | |
|---|---|---|
| 2,101,583 | Honneknovel | Dec. 7, 1937 |
| 2,623,552 | Compton et al. | Dec. 30, 1952 |
| 2,652,075 | Mannes | Sept. 15, 1953 |